United States Patent
Posson (10) Patent No.: US 7,360,797 B2
(45) Date of Patent: Apr. 22, 2008

(54) COUPLING ASSEMBLY AND METHOD

(75) Inventor: Michael D. Posson, Midland, TX (US)

(73) Assignee: Robroy Industries, Inc., Verona, PA (US)

( * ) Notice: Subject to any disclaimer, the term of this patent is extended or adjusted under 35 U.S.C. 154(b) by 303 days.

(21) Appl. No.: 10/513,213

(22) PCT Filed: May 5, 2003

(86) PCT No.: PCT/US03/14065

§ 371 (c)(1),
(2), (4) Date: Apr. 22, 2005

(87) PCT Pub. No.: WO03/093714

PCT Pub. Date: Nov. 13, 2003

(65) Prior Publication Data

US 2005/0173919 A1    Aug. 11, 2005

(51) Int. Cl.
*F16L 9/147*    (2006.01)
(52) U.S. Cl. .......................... 285/55; 285/333; 29/456
(58) Field of Classification Search .................. 285/45, 285/48, 50, 53, 54, 55, 333, 334; 29/456
See application file for complete search history.

(56) References Cited

U.S. PATENT DOCUMENTS

| 570,166 | A | | 10/1896 | Greenfield | |
|---|---|---|---|---|---|
| 1,909,075 | A | | 5/1933 | Ricker et al. | |
| 3,253,841 | A | * | 5/1966 | Ahmad | 285/55 |
| 3,298,716 | A | * | 1/1967 | Taylor et al. | 285/55 |
| 3,472,533 | A | * | 10/1969 | Turner | 285/55 |
| 3,479,059 | A | * | 11/1969 | Taylor et al. | 285/55 |
| 4,366,971 | A | * | 1/1983 | Lula | 285/55 |
| 4,509,776 | A | | 4/1985 | Yoshida et al. | |
| 5,069,485 | A | | 12/1991 | Allen et al. | |
| 5,282,652 | A | * | 2/1994 | Werner | 285/55 |
| 6,036,235 | A | * | 3/2000 | Anderson et al. | 285/55 |
| 6,312,024 | B1 | | 11/2001 | Dutilleul et al. | |

FOREIGN PATENT DOCUMENTS

JP    617975    *    1/1994    .................. 285/55

* cited by examiner

*Primary Examiner*—David E Bochna
(74) *Attorney, Agent, or Firm*—The Webb Law Firm (57) ABSTRACT

The liner assembly (10) is for use in a joint between two pipe segments. The assembly (10) includes a first ring member (50), a second ring member (60) and a corrosion barrier ring (70). The first ring member (50) is configured to cooperate with a first liner (30) inserted in a first pipe segment (12). The second ring member (60) is configured to cooperate with a second liner (34) inserted in a second pipe segment (14) to be joined to the first pipe segment (12). The corrosion barrier ring (70 is disposed between and cooperates with the first ring member (50) and second ring member (60). The corrosion barrier ring (70) includes opposing indented ends (72) cooperating with the second ends (54, 64) of the first and second ring members (50, 60). The second ends (54, 64) of the first and second ring members (50, 60) define corresponding registering shapes to cooperate with the opposing indented ends (72) of the corrosion barrier ring (70).

20 Claims, 3 Drawing Sheets

COUPLING ASSEMBLY AND METHOD

BACKGROUND OF THE INVENTION

1. Field of the Invention

The present invention relates to a coupling system utilized in connecting end-to-end lined pipe used in oil wells and the like, more particularly, a liner assembly for use in a joint between two pipe segments and a method of connecting two pipe segments.

2. Description of Related Art

Many downhole oil-production operations are carried out in highly corrosive environments resulting from production and/or re-injection of hydrocarbons and formation of brinewaters containing salts and gases, such as hydrogen sulfide and carbon dioxide which can pass through the pipe interior.

To provide a useful life to the lengths of steel pipes that are used in such environments, corrosive resistant liners are installed within each pipe length before it is installed into the downhole string. Appropriate threaded coupling assemblies are required to connect the pipe in an end-to-end relationship. Coupling assemblies are also required to connect the internal liners that provide protection for the pipe and pipe threaded connection area against internal corrosion.

There are a large number of pipe end constructions and thread constructions employed by various pipe manufacturers to assure against fluid leakage. Due to the presence of unique metal-to-metal torque shoulders and metal-to-metal seal areas, many of these pipe end and thread constructions known in the art require a custom built liner or coupling assembly unique to the pipe end and potentially even a custom pipe end thread design to accommodate an internal lining system.

One method known in the art utilizes an internal lining system that requires the insertion of a rigid plastic tube inside steel tubing and filling the annular space between the plastic tube and steel tubing with mortar. The inner rigid plastic tube, or liner, is continued around the end of the pipe with a flange, known as a "flare". The flare ends provide a landing area for compression of an elastomeric ring, such as a corrosion ring, in the coupling assembly.

An obstacle with insertion of such an assembly is that the threaded pipes or couplings need to be machined and threaded with special provisions to accommodate the lining process. This proves to be ineffective in time and cost as well as productivity. In view of the foregoing, there is a need for a standardized or universal internal liner coupling assembly that can accommodate the wide variety of pipe end constructions currently in use, without the need for special modifications to proprietary pipe end threads and couplings.

SUMMARY OF THE INVENTION

The present invention is generally a liner assembly for use in a joint between two pipe segments having a first ring member, a second ring member, and a corrosion barrier ring. The first ring member has a first end configured to cooperate with the first liner and a second end. The first ring member is configured to cooperate with a first liner inserted in a first pipe segment. The second ring member is configured to cooperate with a second liner inserted in a second pipe segment to be joined to the first pipe segment. The second ring member includes a first end configured to cooperate with the second liner and a second end. The corrosion barrier ring is disposed between and cooperates with the first ring member and the second ring member. The corrosion barrier ring includes opposing indented ends cooperating with the second ends of the first and second ring. The seconds ends of the first and second ring members define corresponding registering shapes to cooperate with the opposing indented ends of the corrosion barrier ring.

The opposing indented ends of the corrosion barrier ring may include beveled portions with the second ends of the first and second ring members having registering beveled portions to cooperate with the opposing indented ends of the corrosion barrier ring. The beveled portions of the corrosion barrier ring and the second ends of the first and second ring members may be beveled at 45° angles or rectangular-shaped notches. The beveled portions of the second ends of the first and second ring members may be replaced by rectangular-shaped notches. The opposing indented ends of the corrosion barrier ring may also define rectangular-shaped notches adapted to register with the rectangular shaped notches in the second ends of the first and second ring members.

The first and second ring members may be made of glass reinforced epoxy. The corrosion barrier ring may be made of a resilient elastomeric material. At least a portion of the inner surface of the first ring member may taper towards the first end such that the first ring member defines a diverging opening. At least a portion of the inner surface of the second ring member may taper towards the first end such that the second ring member defines a diverging opening. The second ends of the first and second ring members may be bonded adhesively to the opposing ends of the corrosion barrier ring.

The present invention is also directed to a coupling assembly for use in a downhole gas or oil well. The coupling assembly generally includes a first pipe segment, a second pipe segment, a coupling member fixedly connecting the first and second pipe segments, and a liner assembly. The liner assembly extends internally between the first and second pipe segments. The liner assembly includes a first liner, a second liner, a first ring member, a second ring member, and a corrosion barrier ring. The first liner is disposed in the first pipe segment and the second liner is disposed in the second pipe segment. The first ring member has a first end cooperating with the first liner and a second end. The second ring member has a first end cooperating with the second liner and a second end. The corrosion barrier ring is disposed between and cooperates with the first and second ring members. The corrosion barrier ring includes opposing indented ends cooperating with the second ends of the first and second ring members. The second ends of the first and second ring members define corresponding registering shapes to cooperate with the opposing indented ends of the corrosion barrier ring.

The opposing indented ends of the corrosion barrier ring may include beveled portions with the second ends of the first and second ring members having registering beveled portions adapted to cooperate with the opposing indented ends of the corrosion barrier ring. The beveled portions of the corrosion barrier ring and the second ends of the first and second ring members may be beveled at 45° angles. The opposing indented ends of the corrosion barrier ring may also define rectangular-shaped notches, with the second ends of the first and second ring members defining registering rectangular-shaped notches adapted to cooperate with the rectangular-shaped notches in the corrosion barrier ring.

The first and second ring members may be made of glass reinforced epoxy. The corrosion barrier ring may be made of a resilient elastomeric material. At least a portion of the inner surface of the first ring member may taper toward the first end thereof such that the first ring member defines a diverging opening. At least a portion of the inner surface of the second ring member may taper toward the first end such that the second ring member defines a diverging opening. The first and second pipe segments may be externally threaded and the coupling member may include an internally threaded coupling member joining the first and second pipe segments. The first and second liners may be bonded in the first and second pipe segments by an adhesive. The second ends of the first and second ring members may be bonded adhesively to the opposing ends of the corrosion barrier ring.

The present invention is further directed to a method of connecting two pipe segments. The initial step of the method may include providing a first and second pipe segment. A first liner is then inserted into the first pipe segment. A second liner is inserted into the second pipe segment. A first ring member is placed in engagement with the first liner, with the first ring member having a first end cooperating with the first liner and a second end. A second ring member is placed in engagement with the second liner, with the second ring member having a first end cooperating with the second liner and a second end. A corrosion barrier ring is interposed between the second ends of the first and second ring members, with the corrosion barrier ring including opposed indented ends cooperating with the second ends of the first and second ring members. The second ends of the first and second ring members define corresponding registering shapes to cooperate with the opposing indented ends of the corrosion barrier ring.

The method may also include the step of fixedly joining the first and second pipe segments with an external coupling member extending between the first and second pipe segments. The method may further include the steps of providing a coupling member adapted to receive ends of the first and second pipe segments therein, receiving an end of the first pipe segment having the first liner disposed therein into the coupling member, and receiving an end of the second pipe segments having the second liner disposed therein into the coupling member. Preferably, the end of the second pipe segment is received in the coupling member after the step of interposing a corrosion barrier ring between the second ends of the first and second ring members. The coupling member fixedly joins the first and second pipe segments together.

The coupling member may be internally threaded and the ends of the first and second pipe segments may be externally threaded. The step of receiving the end of the first pipe segment into the coupling member may include threading the end of the first pipe segment into the coupling member, and the step of receiving the end of the second pipe segment into the coupling member may include threading the end of the second pipe segment into the coupling member. The method may also include the step of compressing the corrosion barrier ring between the second ends of the first and second ring members during the step of receiving the end of the second pipe segment into the coupling member. Additionally, the first and second liners may be adhesively bonded to the inner surface of the first and second pipe segments, respectively. The method may further include adhesively joining the first ends of the first and second ring members to the first and second liners, respectively.

The opposing indented ends of the corrosion barrier ring may include beveled portions and the second ends of the first and second ring members may include registering beveled portions, whereby the step of interposing the corrosion barrier ring between the second ends of the first and second ring barriers may include engaging the beveled portion of the first and second ring members with the beveled portions of the opposing indented ends.

The present invention will allow for the placement of the liner assembly inside a shoulder-to-shoulder premium thread without the thread manufacturer having to make a special coupling with a corrosion barrier ring groove in the coupling. Furthermore, the present invention is adaptable to existing insert liner systems and can be utilized with API (American Petroleum Institute) Threaded Connections as well as in Premium Threaded Connections of prior art systems.

Further details and advantages of the present invention will become apparent from the following detailed description when read in conjunction with the drawings, wherein like reference numerals represent like elements throughout.

DETAILED DESCRIPTION OF THE INVENTION

A conventional process of connecting pipes in the oil and gas industry utilizes steel threaded couplings, which are machined and threaded and adapted to accommodate an insert liner. The present invention relates generally to a coupling assembly 1 used to connect adjacent or opposing pipe segments, and a liner assembly 10 for use in the coupling assembly 1. The coupling assembly 1 is adapted to connect internal liners of the liner assembly 10 as described in detail hereinafter.

Figure 1:
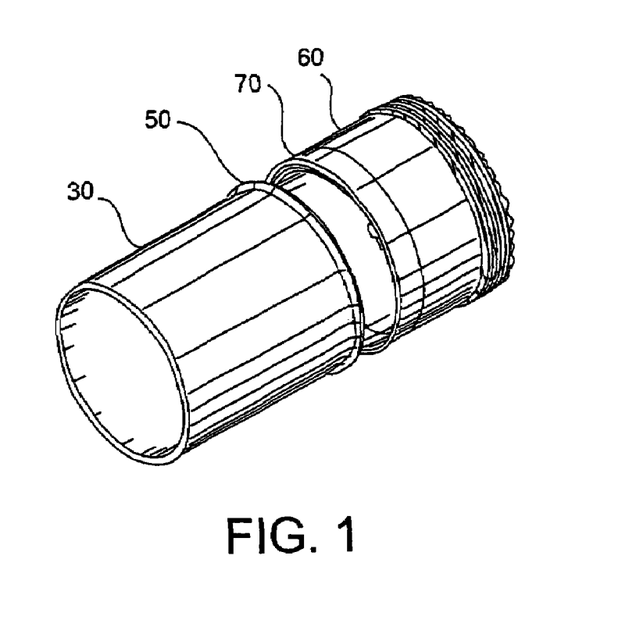
FIG. 1 is a top perspective view of a coupling assembly having a liner assembly according to the present invention.
Figure 2:
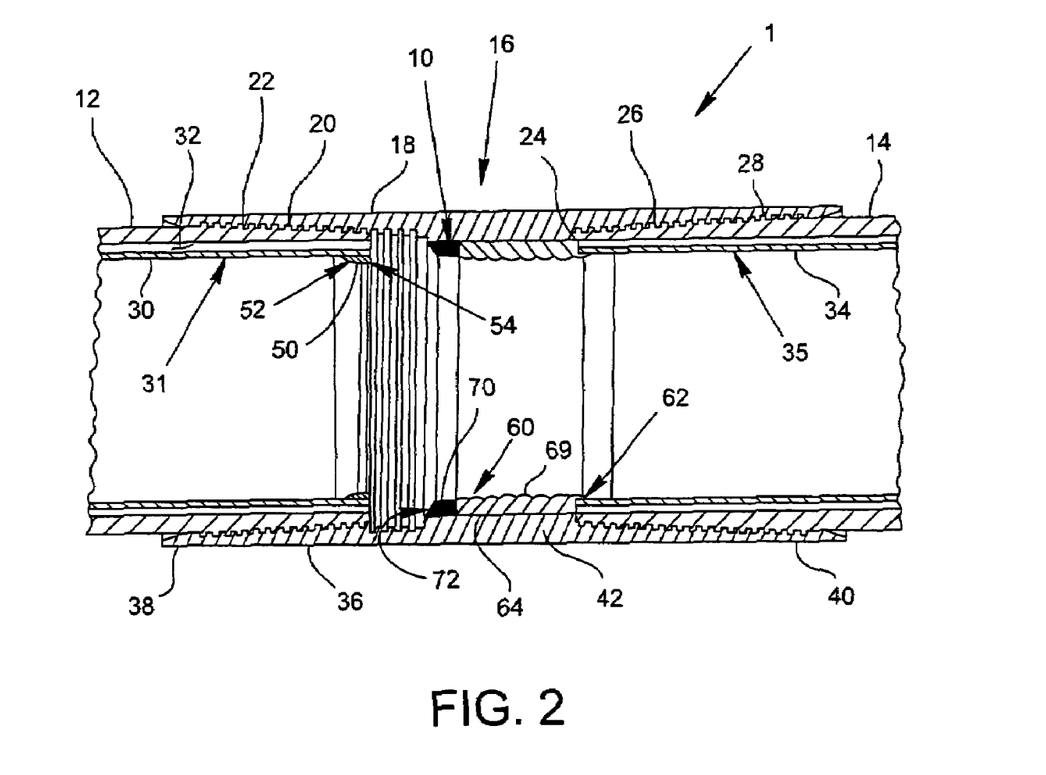
FIG. 2 is a cross-sectional view of the coupling assembly of FIG. 1 in a partially open position according to the present invention.

FIGS. 1 and 2 illustrate the coupling assembly 1 according to the present invention. The coupling assembly 1 generally includes a first pipe segment 12, a second pipe segment 14, a coupling member 16 interconnecting the first and second pipe segments 12, 14, and the liner assembly 10 generally disposed within the area defined by the coupling member 16. A first end 18 of the first pipe segment 12 has external threads 20 extending along a portion 22 of the first end 18 and a second end (not shown). The first end 18 of the first pipe segment 12 may be referred to as the coupling end and the second end (not shown) may be referred to as the pin end, as is commonly known in the art. The second pipe segment 14 has a second end 24. The second end 24 of the second pipe segment 14 has external threads 26 extending along a portion 28 of the second end 24 and a first end (not shown). Accordingly, the second end 24 may be referred to as the pin end because it is the end that is inserted into the coupling member and the first end (not shown) may be referred to as the coupling end. Hereinafter, the first end 18 of the first pipe segment 12 and the second end 24 of the second pipe segment 14 will be referred to as ends 18, 24, respectively, and are the ends that are to be connected by the coupling member 16.

The coupling assembly 1 includes the liner assembly 10. The liner assembly 10 includes a first liner 30 disposed in the first pipe segment 12. The first liner 30 is placed in the first pipe segment 12 and defines an annular gap 32 with the inside surface of the first pipe segment 12, which is typically filled with mortar, as is know in the art. For oil and gas applications, the mortar may be a mixture of oil well cements and oil well cement additives mixed with water to a controlled slurry viscosity. The liner assembly 10 further includes a second liner 34 disposed in the second pipe segment 14, and preferably cemented therein in the manner discussed hereinabove in connection with the first liner 30. The first liner 30 and the second liner 34 may be made of materials such as filament wound fiber reinforced thermosetting resin or extruded thermoplastic, and the like.

The first end 18, or the coupling end, of the first pipe segment 12 and the second end 24, or the pin end, of the second pipe segment 14 are connected together by the coupling member 16, as indicated previously. The coupling member 16 is preferably a steel threaded coupling, which has internal threads 36 provided in both ends. In particular, internal threads 36 are provided at a first end 38 and a second end 40 of the coupling member 16 and a central, unthreaded portion 42 is located between the first end 38 and the second end 40. The internal threads 36 located at the first end 38 receive the external threads 20 of the first end 18 of first pipe segment 12 and the internal threads 36 located at the second end 40 receive the external threads 26 of the second end 24 of the second pipe segment 14. The coupling member 16 may vary in shape and size for various applications. For example, the first and second ends 38, 40 of the coupling member 16 may be tapered to further ensure a tighter seal between the first and second pipe segments 12, 14 and the coupling member 16. Additionally, the threaded coupling member 16 may be replaced by a flanged coupling member 16, as known in the art.

Figure 3:
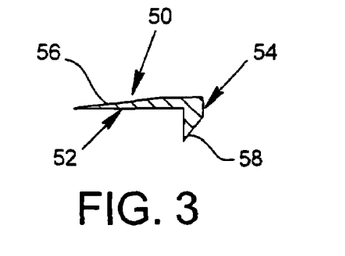
FIG. 3 is a schematic cross-sectional view of a first ring member used in the coupling assembly of FIG. 1.
Figure 4:
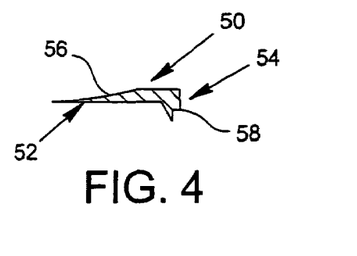
FIG. 4 is a schematic cross-sectional view of the first ring member used in the coupling assembly according to another embodiment of the present invention.

As illustrated in FIGS. 3 and 4, the liner assembly 10 includes a first ring member 50 configured to cooperate with the first liner 30 at the first end 18 of the first pipe segment 12. The first ring member 50 includes a first end 52 and a second end 54. The first end 52 is configured to cooperate with the first liner 30. A portion 56 of the inner surface of the first ring member 50 tapers outward towards the first end 52 so that the first ring member 50 generally defines a diverging opening. The first end 52 of the first ring member 50 is preferably contiguous (i.e., flush) with the first liner 30. The second end 54 of the first ring member 50 defines a shoulder and includes a beveled portion 58. The first ring member 50 may be made of molded fiber reinforced resin and the like. The first ring member 50 is preferably adhered or bonded to the inner surface 31 of the first liner 30 in the first pipe segment 12 with an adhesive, such as epoxy, which is of a different composition than the mortar utilized between the pipe segments 12, 14 and the liners 30, 34.

Figure 5:
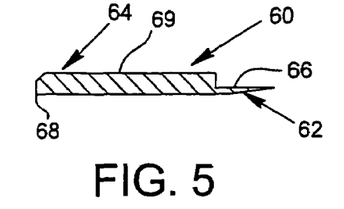
FIG. 5 is a schematic cross-sectional view of a second ring member used in the coupling assembly of FIG. 1.
Figure 6:
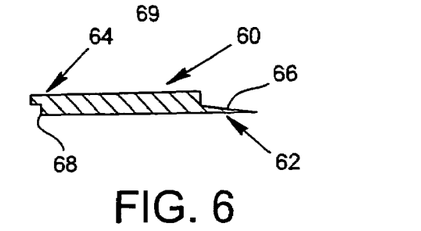
FIG. 6 is a schematic cross-sectional view of the second ring member used in the coupling assembly according to another embodiment of the present invention.

As illustrated in FIGS. 5 and 6, the liner assembly 10 further includes a second ring member 60 cooperating with the second liner 34 at the second end 24 of the second pipe segment 14. The second ring member 60 has a first end 62, a second end 64, and an extended body portion 69 between the first end 62 and the second end 64. In particular, the first end 62 of the second ring member 60 is configured to cooperate with the second liner 34 inserted into the second pipe segment 14. A portion 66 of the inner surface of the second ring member 60 tapers outward toward the first end 62 such that the second ring member 60 defines a diverging opening. The first end 62 of the second ring member is preferably contiguous (i.e., flush) with the second liner 34. The second end 64 of the second ring member 60 defines a shoulder and includes a beveled portion 68.

The extended body portion 69 of the second ring member 60 has a longer axial length than the body of the first ring member 50 and is generally shaped to fit within (i.e., cooperate with) the unthreaded portion 42 of the coupling member 16. The extended body portion 69 of the second ring member 60 may be adjusted (i.e., sized) to accommodate different length coupling members 16. The extended body portion 69 ensures internal protection of the unthreaded portion 42 of the coupling member 16 and protects the coupling member 16 from corrosion. The second ring member 60 may be made of molded fiber reinforced resin and the like. The second ring member 60 is preferably adhered by epoxy and the like to the inner surface 35 of the second liner 34 of the second pipe segment 14.

Figure 7:
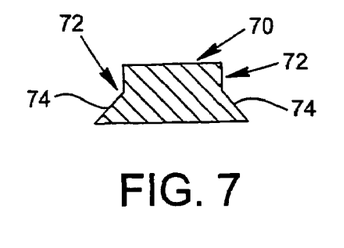
FIG. 7 is a schematic cross-sectional view of a corrosion barrier ring used in the coupling assembly of FIG. 1.
Figure 8:
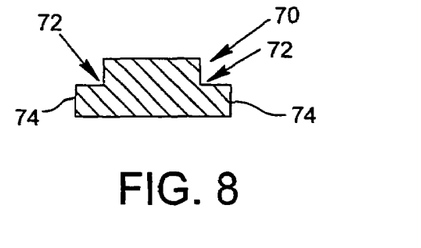
FIG. 8 is a schematic cross-sectional view of the corrosion barrier ring used in the coupling assembly according to another embodiment of the present invention.
Figure 9:
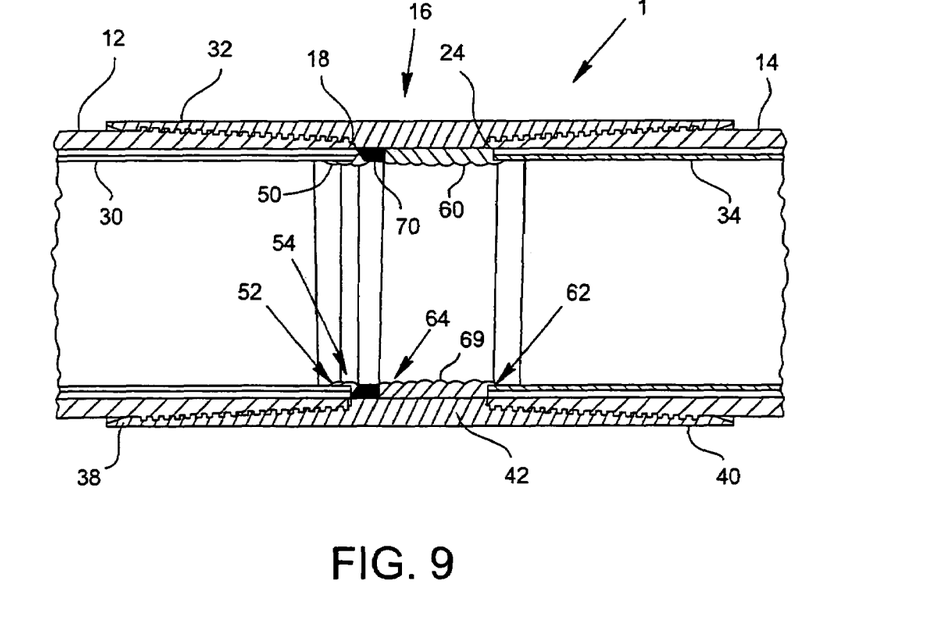
FIG. 9 is a cross-sectional view of the coupling assembly of FIG. 1 in a fully engaged position.

The liner assembly 10 includes a corrosion barrier ring 70 disposed between the first and second ring members 50, 60. The corrosion barrier ring 70 may be made of glass reinforced PTFE (Teflon) and the like. The corrosion barrier ring 70 defines opposing indented ends 72. The opposing indented ends 72 further include beveled portions 74. The opposing indented ends 72 may define shapes other than beveled, as discussed herein, but beveled is preferred.

Opposing indented ends 72 of the corrosion barrier ring 70 cooperate with the first ring member 50 and the second ring member 60. In particular, the opposing indented ends 72 cooperate with the second ends 54, 64 of the first ring member 50 and the second ring member 60, respectively. More particularly, the beveled portions 58, 68 of the second ends of the first ring member 50 and the second ring member 60, are adapted to register with the beveled portions 74 of the corrosion barrier ring 70. The cooperation between the opposing indented ends 72 with the second end 54 of the first ring member 50 on one side and the second end 64 of the second ring member 60 on the opposite side, ensures integrity of the sealing fit of the liner assembly 10.

The liner assembly 10 is shown in greater detail in FIGS. 3, 5, and 7. In FIG. 7, the opposing indented ends 72 having the beveled portions 74 of the corrosion barrier ring 70 are shown. The beveled portions 74 are preferably beveled at 45° angles. FIGS. 3 and 5 illustrate the first ring member 50 and the second ring member 60. In FIG. 3, the beveled portions 58 at the second end 54 of the first ring member 50 are also beveled at 45° angles. When placed adjacent to one end of the corrosion barrier ring 70, the 45° angle of the beveled portions 58 at the second end 54 of the first ring member 50 complements the 45° angle of the beveled portion 74 of the corrosion barrier ring 70 to seal and join the corrosion barrier ring 60 and the first ring member 50 together. Similarly, as illustrated in FIG. 5, the beveled portion 68 at the second end 64 of the second ring member 60 is beveled at a 45° angle. When placed adjacent the opposite end of the corrosion barrier ring 70, the 45° angle defined by the beveled portion 68 at the second end 64 of the second ring member 60 complements the 45° angle of the beveled portion 74 of the corrosion barrier ring 70 to seal and join the opposite side of the corrosion barrier ring 70 to the second ring member 60.

As indicated previously, the beveled portion 74 of the corrosion barrier ring 70 may be of any shape or size, so long as the first ring member 50 and the second ring member 60 have registering (i.e., corresponding) beveled portions 58, 68, respectively. Another embodiment of the present invention is illustrated in FIGS. 4, 6, and 8. FIG. 8 illustrates the corrosion barrier ring 70 having opposing indented ends 72, with beveled portions 74 as rectangular notches. FIGS. 4 and 6 illustrate the mating first ring member 50 and the second ring member 60. In FIG. 4, the second end 54 of the first ring member 50 has a beveled portion 58 in the shape of a rectangular notch. When placed adjacent to one end of the corrosion barrier ring 70, the rectangular notch of the second end 54 of the first ring member 50 complements the rectangular notch of the beveled portion 74 of the corrosion barrier ring 70 to engage and fittingly join together. Accordingly, as illustrated in FIG. 6, the second end 64 of the second ring member 60 also has a corresponding beveled portion 68 of a rectangular notch. When placed adjacent the opposing end of the corrosion barrier ring 70, the rectangular notch of the second end 64 of the second ring member 60 complements and registers with the rectangular notch of the beveled portion 74 of the corrosion barrier ring 70 to also fittingly join together. Therefore, the beveled portions 74 of the corrosion barrier 70 and the corresponding registering beveled portions 58, 68 of the second ends 54, 64 of the first ring member 50 and the second ring member 60 can vary in shape and size to allow engagement of liner assembly 10.

The present invention is also directed to a method of connecting two pipe segments. Initially, the first pipe or pipe segment 12 and the second pipe or pipe segment 14 are provided. The first liner 30 is inserted into the first pipe 12 and the second liner 34 is inserted into the second pipe 14. The first ring member 50 is placed in engagement with the first liner 30. As discussed hereinabove, the first ring member 50 includes a first end 52 cooperating with the inner surface 31 of the first liner 30 and a second end 54. The second ring member 60 is placed in engagement with the second liner 34. The first end 62 of the second ring member 60 cooperates with the inner surface 35 of the second liner 34. The corrosion barrier ring 70 is interposed between the second ends 54, 64 of the first and second ring members 50, 60 in the manner discussed previously. The opposing indented ends 72 of the corrosion barrier ring 70 cooperate with the second ends 54, 64 of the first and second ring members 50, 60, respectively. The second ends 54, 64, of the first and second ring members 50, 60 define corresponding registering shapes to cooperate with the opposing indented ends 72 of the corrosion barrier ring 70.

The method preferably also includes the step of fixedly joining the first and second pipe segments 12, 14 with the external coupling member 16 extending between the first and second pipe segments, 12, 14, respectively. The coupling member 16 is adapted to receive the ends 18, 24 of the first and second pipe segments 12, 14. The first pipe segment 12 is received into the coupling member 16 by engaging the external threads 20 of the first pipe segment 12 with the internal threads 36 of the coupling member 16. The first pipe segment 12 has the first liner 30 disposed therein, and preferably adhesively bonded therein with the first ring member 50 adhesively joined to the first liner 30. Typically, the threaded coupling member 16 is engaged with the first end 18 of the first pipe segment 12 including the first liner 30 and the first ring member 50, prior to installation, for example, in an oil or gas well. The corrosion barrier ring 70 is then installed in the coupling member 16 such that the beveled portion 74 engages with the beveled portion 58 at the second end 54 of the first ring member 50. Once corrosion barrier ring 70 is installed in the coupling member 16, the second pipe segment 14 is threaded into the coupling member 16 such that the beveled portion 74 on the opposing end of the corrosion barrier ring 70 engages with the beveled portion 68 of the second end 64 of the second ring member 60. The corrosion barrier ring 70 is then compressed between the second ends 54, 64 of the first and second ring members 50, 60 as the second pipe segment 14 is rotated into engagement with the coupling member 16, which fixedly joins the first and second pipe segments 12, 14 together. The unthreaded portion 42 of the coupling member 16 functions to absorb the concentrated stresses so as to allow the corrosion barrier ring 70 to be compressed between the first ring member 50 and the second ring member 60. The compressed corrosion barrier ring 70 is maintained in place by the first liner 30 and the second liner 34 and acts to prevent fluids passing through the joined pipe segments from causing the coupling member 16 to fail due to internal corrosion. The liners 30, 34 additionally function to energize or compress the corrosion barrier ring 70 inside the connection between the first and second pipe segments 12, 14 to provide continuous corrosion protection not only inside lined pipes or casing joints generally, but also through a threaded connection, such as the coupling member 16. The corrosion barrier ring 70 undergoes further compression between the second ends 54, 64 of the first ring member 50 and the second ring member 60 as new pipe is added to the pipe string.

EXAMPLES

The coupling assembly 1 of the present invention was tested under field conditions as described hereinafter. Coupling assemblies 1, as taught by this invention, were subjected to rigorous and various types of testing. Four foot sections of piping (i.e., pipe segments), for example, were taken from forty feet pipes and connected so as to simulate a downhole piping installation situation. The sections of piping using the coupling assemblies 1 were then connected and disconnected numerous times over a period of time to verify repeatability of the process to ensure mechanical integrity as well as physical integrity. The coupling assemblies 1 was subjected to greater than 4,000 ft. lbs. torque with the use of power tongs to position the threads of the coupling member 16 to final resting positions. This test was performed to ensure that the coupling assemblies 1 and the liner assemblies 10 did not demonstrate signs of distortion or distress to the pipe string. The coupling assemblies 1 were successful in achieving repeatable results with no indications of distortion, distress, or buckling to the pipe string while being subjected to over 4,000 ft. lbs. torque.

Another test included testing 5.5" diameter pipe in various lab and machine shop tests with elastomer wiper plugs. Elastomer wiper plugs, commonly known as cementing wiper plugs in the industry, were utilized to verify the absence of interference around the liner assemblies 10. The test required sections of piping assembled in a similar manner as above and placing the pipe string in a well. The cement is pushed through the piping having the liner assemblies 10 inserted therein, and the cementing wiper plugs are pushed down through the pipe with strong fluid force. As the cementing wiper plug is pushed down through the piping, the cement is displaced and exits through the bottom of the piping and up around the outside surface of the liner (i.e., first and second liners 30, 34) and fills the annular gap between the liner and piping. Additional fluids were pumped through the liner assemblies 10, coupling assemblies 1, and joints. This test was also done in a controlled environment, where fluids were pumped and wiper plugs pushed through the bore of the liner to wipe the fluids dry to replicate actual well procedures. The test results verified that the coupling assembly 1 demonstrated that no areas of interference occurred as the cementing wiper plug passed back and forth through the liner assembly 10 along the pipe string.

A final test included furnishing 5.5" diameter steel tubing joints lined with the liner assembly 10 of the coupling assembly 1. The joints were assembled and test caps, in particular pressure holding caps were installed on either end while allowing these joints to be fitted into a load frame. The purpose of this test was to evaluate and observe the liner assembly 10 with respect to impact on connection performance. Once in the load frame, various stress loads were applied to the lined steel joints using the liner assembly 10 and the coupling assembly 1 of the present invention. These stress loads included internal pressure cycling, tensile load, bending load, and temperature cycling. The loads were all applied and varied simultaneously, and additionally were reversed.

Figure 10:
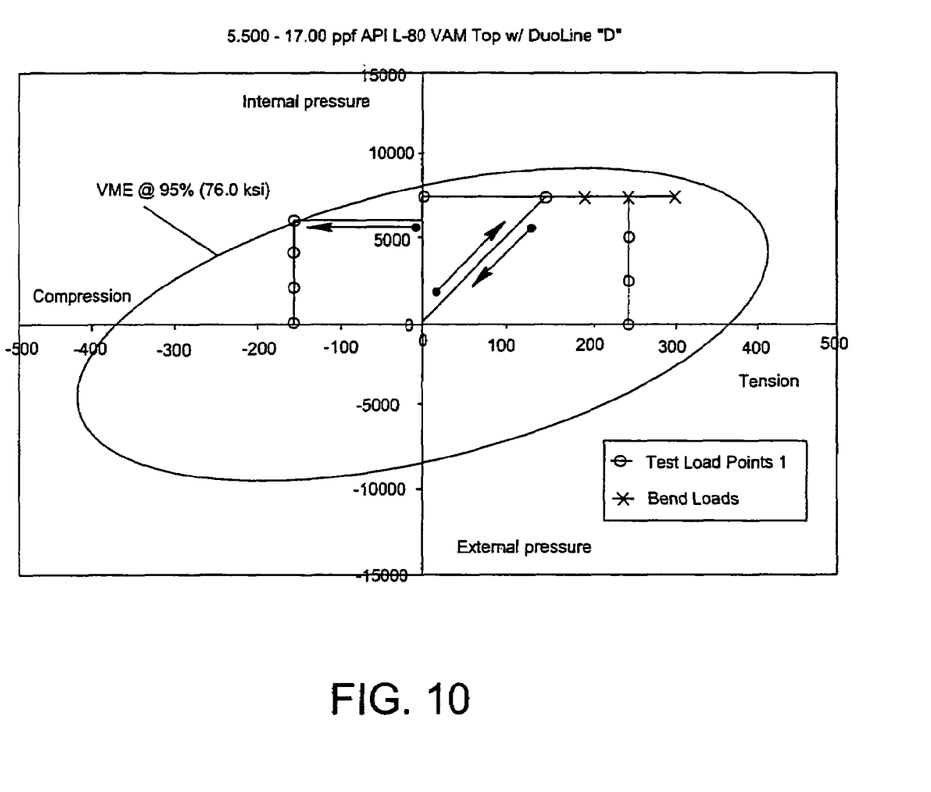
FIG. 10 is a VME curve illustrating results of load sequence tests performed on the present invention.

In particular, this load sequence reflects ISO 13679 requirements of determining or validating a product/connection performance envelope in a combined load environment. As illustrated in FIG. 10, the tested combined load envelope is limited to Quadrants I and II of the VME Ellipse, which is commonly used in the art. Maximum test loads were determined using the Specified Minimum Material Yield Strength (SMYS) where applicable. The Quadrant I loads were based on specified test requirements, while Quadrant II maximum loads were specified for axial compression loading and with internal pressure limited by the 95% of VME (based on SMYS) combined load boundary limit. Therefore, testing confirmed that extremely high stress loads, for example, 95% of pipe body rated yield strength, could be applied to the pipe with the coupling assembly 1 of the preset invention without adverse effects to the liner assembly.

In use, the present invention has proven that it may be utilized in a variety of applications, such as connecting two different pipes having different threading. For example, in an application for Exxon-Mobile, the coupling assembly 1 of the present invention was installed in 5.5" diameter piping at an offshore well site near Aberdeen, Scotland. The offshore well site has over 11,000 feet of pipe installed using the coupling assembly of the present invention. The pipe string includes a variety of different weights of pipes, i.e., different wall thickness specifications, and different threaded connections. The coupling assembly 10 of the present invention allows existing piping to be connected without the cost or time considerations of having to rethread or install alternate couplings on the pipe so as to enable the pipe to be internally coated or lined for corrosion resistance.

The present invention thus allows for adaptability in use of the coupling assembly 1 with various insert liner designs and thus also permits the installation of a corrosion-resistant liner inside a threaded connection that has metal-to-metal torque shoulders and metal-to-metal seal areas. In addition, the present invention may be utilized in environments with high temperatures, such as 375° F., as well as exposures to brinewater, hydrogen sulfide, carbon dioxide, and other corrosive media The present invention eliminates the need for threaded pipes or couplings to be machined and threaded with special provisions to accommodate the insert liner.

While a specific embodiment of the invention has been described in detail, it will be appreciated by those skilled in the art that various modifications and alternatives to those details could be developed in light of the overall teachings of the disclosure. The presently preferred embodiment described herein is meant to be illustrative only and not limiting as tot the scope of the invention which is to be given the full breadth of the appended claims and any and all equivalents thereof.

The invention claimed is:

1. A coupling assembly comprising:
a first pipe, including a first liner inserted within the first pipe, with external threads extending along a portion of a first end of the first pipe;
a second pipe, including a second liner inserted within the second pipe, with external threads extending along a portion of a second end of the second pipe;
a coupling member, with internal threads provided at a first end and a second end of the coupling member and an unthreaded portion extending between the first end and the second end, fixedly connecting the first pipe and the second pipe;
a first ring member configured to cooperate with and overlap the first liner, the first ring member comprising a first end configured to cooperate with the first liner and a second end;
a second ring member configured to cooperate with and overlap the second liner, the second ring member comprising a first end configured to cooperate with the second liner, a second end, and an extended body member between the first and second ends, the extended body member positioned in contact with the unthreaded portion of the coupling member; and
a corrosion barrier ring disposed between and cooperating with the first ring member and the second ring member, the corrosion barrier ring comprising opposing indented ends cooperating with the second ends of the first and second ring members;
wherein the second ends of the first and second ring members define corresponding registering shapes to cooperate with the opposing indented ends of the corrosion barrier ring.

2. The coupling assembly of claim 1, wherein the opposing indented ends of the corrosion barrier ring comprise beveled portions and the second ends of the first and second ring members comprise registering beveled portions to cooperate with the opposing indented ends of the corrosion barrier ring.

3. The coupling assembly of claim 2, wherein the beveled portions of the corrosion barrier ring and the second ends of the first and second ring members are beveled at a 45° angle.

4. The coupling assembly of claim 1, wherein the opposing indented ends define rectangular-shaped notches, and wherein the second ends of the first and second ring members define registering rectangular-shaped notches to cooperate with the rectangular-shaped notches of the corrosion barrier ring.

5. The coupling assembly of claim 1, wherein the first and second ring members are made of glass reinforced epoxy.

6. The coupling assembly of claim 1, wherein the corrosion barrier ring is made of a resilient elastomeric material.

7. The coupling assembly of claim 1, wherein at least a portion of the inner surface of the first ring member tapers toward the first end thereof such that the first ring member defines a diverging opening.

8. The coupling assembly of claim 1, wherein at least a portion of the inner surface of the second ring member tapers toward the first end thereof such that the second ring member defines a diverging opening.

9. The coupling assembly of claim 1, wherein the first and second liners are bonded in the first and second pipe segments by an adhesive and the second ends of the first and second ring members are bonded adhesively to the opposing ends of the corrosion barrier ring.

10. A method of connecting two pipe segments, comprising the steps of:
 providing a first pipe segment with external threads extending along a portion of a first end of the first pipe;
 providing a second pipe segment with external threads extending along a portion of a second end of the second pipe;
 inserting a first liner into the first pipe segment;
 inserting a second liner into the second pipe segment;
 placing a first ring member in engagement with the first liner, the first ring member having a first end cooperating with and overlapping the first liner and a second end;
 placing a second ring member in engagement with the second liner, the second ring member having a first end cooperating with and overlapping the second liner, a second end, and an extended body member between the first end and the second end;
 interposing a corrosion barrier ring between the second ends of the first and second ring members, the corrosion barrier ring comprising opposing indented ends cooperating with the second ends of the first and second ring members;
 providing a coupling member, with internal threads provided at a first end and a second end of the coupling member and an unthreaded portion extending between the first end and the second end, adapted to receive a first end of the first pipe segment and a second end of the second pipe segment therein;
 receiving a first end of the first pipe segment having the first liner disposed therein into the coupling member to fixedly join the first pipe segment with the coupling member; and
 receiving a second end of the second pipe segment having the second liner disposed therein into the coupling member to fixedly join the second pipe segment with the coupling member,
 wherein the extended body member positioned in contact with the unthreaded portion of the coupling member, and
 wherein the second ends of the first and second ring members define corresponding registering shapes to cooperate with the opposing indented ends of the corrosion barrier ring.

11. A coupling assembly comprising:
 a first pipe, including a first liner inserted within the first pipe, with external threads extending along a portion of a first end of the first pipe;
 a second pipe, including a second liner inserted within the second pipe, with external threads extending along a portion of a second end of the second pipe;
 a coupling member, with internal threads provided at a first end and a second end of the coupling member and an unthreaded annular projection extending between the first end and the second end of the coupling member, the unthreaded annular projection forming a first shoulder and a second shoulder, wherein the external threads of the first end of the first pipe are threaded with the internal threads of the first end of the coupling member until the first end is stopped by the first shoulder formed by the unthreaded annular projection and the external threads of the second end of the second pipe are threaded with the internal threads of the second end of the coupling member until the second end is stopped by the second shoulder formed by the unthreaded annular projection thereby fixedly connecting the first pipe and the second pipe;
 a first ring member configured to cooperate with and overlap the first liner, the first ring member comprising a first end configured to cooperate with the first liner and a second end;
 a second ring member configured to cooperate with and overlap the second liner, the second ring member comprising a first end configured to cooperate with the second liner, a second end, and an extended body member between the first and second ends, the extended body member positioned in contact with the unthreaded annular projection of the coupling member; and
 a corrosion barrier ring disposed between and cooperating with the first ring member and the second ring member, the corrosion barrier ring comprising opposing indented ends cooperating with the second ends of the first and second ring members;
 wherein the second ends of the first and second ring members define corresponding registering shapes to cooperate with the opposing indented ends of the corrosion barrier ring.

12. The coupling assembly of claim 11, wherein the opposing indented ends of the corrosion barrier ring comprise beveled portions and the second ends of the first and second ring members comprise registering beveled portions to cooperate with the opposing indented ends of the corrosion barrier ring.

13. The coupling assembly of claim 12, wherein the beveled portions of the corrosion barrier ring and the second ends of the first and second ring members are beveled at a 45° angle.

14. The coupling assembly of claim 11, wherein the opposing indented ends define rectangular-shaped notches, and wherein the second ends of the first and second ring members define registering rectangular-shaped notches to cooperate with the rectangular-shaped notches of the corrosion barrier ring.

15. The coupling assembly of claim 11, wherein the first and second ring members are made of glass reinforced epoxy.

16. The coupling assembly of claim 11, wherein the corrosion barrier ring is made of a resilient elastomeric material.

17. The coupling assembly of claim 11, wherein at least a portion of the inner surface of the first ring member tapers toward the first end thereof such that the first ring member defines a diverging opening.

18. The coupling assembly of claim 11, wherein at least a portion of the inner surface of the second ring member tapers toward the first end thereof such that the second ring member defines a diverging opening.

19. The coupling assembly of claim 11, wherein the first and second liners are bonded in the first and second pipe segments by an adhesive and the second ends of the first and second ring members are bonded adhesively to the opposing ends of the corrosion barrier ring.

20. A method of connecting two pipe segments, comprising the steps of:

providing a first pipe segment with external threads extending along a portion of a first end of the first pipe;

providing a second pipe segment with external threads extending along a portion of a second end of the second pipe;

inserting a first liner into the first pipe segment;

inserting a second liner into the second pipe segment;

placing a first ring member in engagement with the first liner, the first ring member having a first end cooperating with and overlapping the first liner and a second end;

placing a second ring member in engagement with the second liner, the second ring member having a first end cooperating with and overlapping the second liner, a second end, and an extended body member between the first end and the second end;

interposing a corrosion barrier ring between the second ends of the first and second ring members, the corrosion barrier ring comprising opposing indented ends cooperating with the second ends of the first and second ring members;

providing a coupling member, with internal threads provided at a first end and a second end of the coupling member and an unthreaded annular projection extending between the first end and the second end of the coupling member, the unthreaded annular projection forming a first shoulder and a second shoulder, the coupling member adapted to receive a first end of the first pipe segment and a second end of the second pipe segment therein;

receiving a first end of the first pipe segment having the first liner disposed therein into the first coupling member and threading the external threads of the first end of the first pipe segment with the internal threads of the first end of the coupling member until the first end of the first pipe is stopped by the first shoulder formed by the unthreaded annular projection thereby fixedly joining the first pipe segment with the coupling member; and receiving a second end of the second pipe segment having the second liner disposed therein into the coupling member and threading the external threads of the second end of the second pipe with the internal threads of the second end of the coupling member until the second end of the second pipe segment is stopped by the second shoulder formed by the unthreaded annular projection thereby fixedly joining the second pipe segment with the coupling member, wherein the extended body member of the second ring is positioned in contact with the unthreaded portion of the coupling member, and wherein the second ends of the first and second ring members define corresponding registering shapes to cooperate with the opposing indented ends of the corrosion barrier ring.

* * * * *

UNITED STATES PATENT AND TRADEMARK OFFICE
CERTIFICATE OF CORRECTION

| | | |
|---|---|---|
| PATENT NO. | : 7,360,797 B2 | Page 1 of 1 |
| APPLICATION NO. | : 10/513213 | |
| DATED | : April 22, 2008 | |
| INVENTOR(S) | : Posson | |

It is certified that error appears in the above-identified patent and that said Letters Patent is hereby corrected as shown below:

<u>Title page of the Patent</u>, insert the following:

Item
                           -- Related U.S. Application Data
(60)    Provisional application No. 60/377,742, filed on May 3, 2002 --

<u>Column 11</u>, line 47, Claim 10, "member positioned in contact" should read
-- member of the second ring is positioned in contact --

Signed and Sealed this

Seventh Day of October, 2008

JON W. DUDAS
*Director of the United States Patent and Trademark Office*